(12) United States Patent
Tanaka et al.

(10) Patent No.: US 6,655,394 B1
(45) Date of Patent: Dec. 2, 2003

(54) METHOD AND APPARATUS FOR REPROCESSING DIALYZERS

(75) Inventors: Noriaki Tanaka, 707, Kitanoda, Sakai-shi, Osaka 588 (JP); Tomiya Abe, Wakayama (JP)

(73) Assignee: Noriaki Tanaka, Osaka (JP)

( * ) Notice: Subject to any disclaimer, the term of this patent is extended or adjusted under 35 U.S.C. 154(b) by 0 days.

(21) Appl. No.: 09/066,332

(22) PCT Filed: Oct. 25, 1996

(86) PCT No.: PCT/JP96/03136
§ 371 (c)(1),
(2), (4) Date: Apr. 29, 1998

(87) PCT Pub. No.: WO98/13078
PCT Pub. Date: Apr. 2, 1998

(30) Foreign Application Priority Data

Sep. 26, 1996 (JP) .............................................. 8-254685

(51) Int. Cl.⁷ .............................. B08B 7/00; B08B 7/04
(52) U.S. Cl. ................ 134/22.18; 134/22.1; 134/22.17; 134/26; 134/28; 134/29
(58) Field of Search .................. 422/28; 134/22.11, 134/22.1, 22.12, 22.13, 22.17, 22.18, 26, 28, 29; 210/636, 748, 749, 753, 754, 759, 760, 764

(56) References Cited

U.S. PATENT DOCUMENTS

| | | | |
|---|---|---|---|
| 3,441,136 A | * | 4/1969 | Serfass et al. |
| 3,753,493 A | * | 8/1973 | Mellor |
| 3,871,913 A | * | 3/1975 | Shaldon |
| 3,920,030 A | * | 11/1975 | Mason |
| 4,166,031 A | * | 8/1979 | Hardy |
| 4,695,385 A | * | 9/1987 | Boag |
| 5,591,344 A | * | 1/1997 | Kenley et al. ............... 210/636 |
| 5,759,489 A | * | 6/1998 | Miura et al. .................. 422/28 |

FOREIGN PATENT DOCUMENTS

| | | |
|---|---|---|
| EP | 0722740 | 7/1996 |
| EP | 0737482 | 10/1996 |
| JP | A 51-9359 | 8/1976 |
| JP | A 7-8455 | 1/1995 |
| JP | A 7-108064 | 4/1995 |
| JP | A 7-116247 | 5/1995 |
| JP | 07-284744 | * 10/1995 |
| JP | 8-252310 | 10/1996 |
| JP | 08 196625 | 12/1996 |

* cited by examiner

Primary Examiner—Alexander Markoff
(74) Attorney, Agent, or Firm—Sughrue Mion, PLLC (57) ABSTRACT

This invention provides a method for reprocessing a dialyzer for hemodialysis, the method comprising the steps of rinsing the dialyzer with water and cleaning it with electrolyzed strongly acidic water, or the steps of rinsing the dialyzer with water, cleaning it with electrolyzed strongly alkaline water, rinsing it with water and cleaning it with electrolyzed strongly acidic water, as well as a reprocessing apparatus for carrying out the reprocessing method.

15 Claims, 3 Drawing Sheets

METHOD AND APPARATUS FOR REPROCESSING DIALYZERS

FIELD OF THE INVENTION

The present invention relates to a method for reprocessing a dialyzer for hemodialysis, and more particularly, to a method for reprocessing a dialyzer by cleaning the dialyzer for reuse. This invention also concerns with a reprocessing apparatus for carrying out said method for reprocessing a dialyzer.

BACKGROUND ART

Reuse of dialyzers for hemodialysis is prohibited by law in Japan in order to prevent infection or the like. However, reuse of dialyzers is allowed in the U.S., People's Republic of China, parts of Europe and other countries, wherein it is allowed, above all, to use the same dialyzer for the same patient a number of times.

For example, in the U.S., reusing dialyzers is beneficial in terms of cost savings for a dialysis center (unit) from the viewpoint of insurance system. Dialyzer reuse grew rapidly during the 1980s. Currently at least 75% of dialysis centers (units) is reusing dialyzers.

Between 1980 and 1992, the mean number of uses is 10 to 14 according to statistics.

Generally, regarding the dialyzer with which hemodialysis has been carried out, its blood compartment (space inside of hollow fiber membranes in the case of a hollow fiber dialyzer) is partly clogged, or blood components such as blood cells, platelets and proteins are deposited on the membrane surface. Further, a dialysate compartment (space inside of a housing holding the hollow fiber membranes in the case of a hollow fiber dialyzer) is contaminated with bacteria, endotoxins and the like derived from the dialysate used.

Consequently, for reuse of such dialyzer, it is necessary to clean the dialyzer with a cleaning disinfectant after dialysis treatment. In the U.S., formaldehyde, acetic acid-peracetic acid-hydrogen peroxide mixtures, glutaraldehyde and the like are used as the cleaning disinfectant.

It is said that the reprocessing procedure can improve the biocompatibility, particularly regarding cellulosic semipermeable membrane type dialyzers which are currently in wide use. That is to say, new cellulosic dialyzers, when used, are likely to cause problems such as leukopenia, hypoxemia, amyloidosis and syndromes which make dialysis difficult, e.g. nausea, vomiting, itching or hypotension due to activation of complement. However, these problems are reportedly alleviated progressively while the dialyzer after dialysis treatment is reused by being cleaned with a germicide, although there is a report demonstrating that such symptoms were not reduced by dialysis with reprocessed cellulose acetate hollow fiber dialyzers.

Despite the potential benefits of dialyzer reuse outlined above, dialyzer reuse may involve risks. Now concerns have arisen regarding its potential long term hazards.

These hazards include, for example, ineffective dialysis because of a poorly functioning dialyzer resulting from degradation of membrane performance, risk of infection due to inadequate sterilization, and influence of long-term exposure to disinfectants.

Especially, with a cellulosic dialyzer, the cleaning disinfectant used for reprocessing deteriorates dialysis membranes and reduces the dialysis function, occasionally resulting in unsatisfactory dialysis treatment.

One of the greatest potential hazards in reuse is the risk of microbial infection due to inadequate sterilization of the dialyzer. Owing to the degradation or damage of dialysis membranes repeatedly exposed to germicides, bacteria may be permitted to pass from the dialysate compartment into the blood compartment, and a patient may be contaminated with toxins such as endotoxins.

Furthermore, there is an adverse influence of a small amount of residual germicide which has not been removed by cleaning in the reprocessing procedure. For example, regarding formaldehyde conventionally used as a germicide for reuse, there is a high incidence of an antibody to blood group N (anti-N like antibody) which resulted in enhanced hemolysis and destruction of kidney grafts. Such immune mechanisms stimulated by formaldehyde exposure which are responsible for hemolysis are induced in patients exposed to formaldehyde concentrations even as low as 2 ppm. Studies in animal species have shown that formaldehyde is carcinogenic.

Consequently, formaldehyde should be completely removed by rinsing. For this purpose, it is necessary to carry out a prolonged expensive rinsing step using a large amount of water. However, the complete removal is substantially impossible from the viewpoints of costs and efficiency.

DISCLOSURE OF THE INVENTION

It is an object of the present invention to provide a method for reprocessing a dialyzer for reuse, which can minimize the reduction in dialysis function due to degradation or damage of the dialyzer, and which uses a safe cleaning disinfectant.

It is another object of the invention is to provide a reprocessing apparatus for carrying out the foregoing reprocessing method.

The present inventors conducted extensive research to achieve these objects, and found that the objects can be achieved when a dialyzer is cleaned for reuse by using electrolyzed strongly acidic water alone as the cleaning disinfectant, or by carrying out cleaning with electrolyzed strongly alkaline water and cleaning with electrolyzed strongly acidic water, with a rinsing step with water being conducted therebetween. The present invention was completed based on this novel finding.

Thus, the present invention provides a method for reprocessing a dialyzer for hemodialysis, the method comprising the steps of rinsing with water (preferably reverse osmosis processed water) a blood compartment and a dialysate compartment of the dialyzer used for dialysis treatment, and cleaning the compartments with electrolyzed strongly acidic water.

The present invention also provides a method for reprocessing a dialyzer for hemodialysis, the method comprising the steps of rinsing with water (preferably reverse osmosis processed water) a blood compartment and a dialysate compartment of the dialyzer used for dialysis treatment, cleaning the compartments with electrolyzed strongly alkaline water, rinsing the compartments with water (preferably reverse osmosis processed water) and cleaning the compartments with electrolyzed strongly acidic water.

Furthermore, the invention also provides an apparatus for cleaning and disinfecting a hemodialysis dialyzer for reprocessing (reprocessing apparatus), the apparatus comprising:

(a) a tank for holding electrolyzed strongly alkaline water, (b) a tank for holding electrolyzed strongly acidic water, (c) a tank for holding water, (d) two pumps, (e) lines extending from the above three tanks and connected to respective inlets of the two pumps, (f) valves disposed in the respective lines mentioned in (e) upstream of the pumps, (g) a line which removably connects an outlet of one of the two pumps to a dialysate inlet port of the dialyzer to be cleaned or to a dialysate outlet port thereof, (h) a line which removably connects an outlet of the other of the two pumps to a blood inlet port of the dialyzer to be cleaned or to a blood outlet port thereof, (i) a line removably connected to the blood inlet port of the dialyzer or to the blood outlet port thereof, the line being disposed for the discharge of the water, electrolyzed strongly alkaline water or electrolyzed strongly acidic water flowing out from the blood compartment of the dialyzer, and (j) a line removably connected to the dialysate inlet port of the dialyzer or to the dialysate outlet port thereof, the line being disposed for the discharge of the water, electrolyzed strongly alkaline water or electrolyzed strongly acidic water flowing out from the dialysate compartment of the dialyzer.

If desired, the above apparatus further comprises:

(k) a first discharge line connected to the downstream terminal end of the line as defined in (i) for the discharge of the water, electrolyzed strongly alkaline water or electrolyzed strongly acidic water flowing out from the blood compartment, (l) a line branching out from the first discharge line, (m) a second discharge line connected to the downstream terminal end of the line as defined in (j) for the discharge of the water, electrolyzed strongly alkaline water or electrolyzed strongly acidic water flowing out from the dialysate compartment, and (n) a line branching out from the second discharge line, wherein a valve is disposed in each of the line (l) branching out from the first discharge line and the line (n) branching out from the second discharge line.

In this case, the membrane pores can be cleaned by opening or closing said valves, i.e. by conducting the so-called reverse filtration.

Further, an electrolyzed water generator may be connected to the above apparatus of the present invention, and can be used as a component of the apparatus. In this case, the apparatus further comprises a line connecting the water tank to a water supply port of the electrolyzed water generator, a line connecting a discharge port for electrolyzed strongly acidic water of the generator to the tank for holding electrolyzed strongly acidic water, and a line connecting a discharge port for electrolyzed strongly alkaline water of the generator to the tank for holding electrolyzed strongly alkaline water.

As compared with conventional methods using formalin, the method of the invention employs electrolyzed strongly alkaline water and electrolyzed strongly acidic water which are non-toxic and non-hazardous, and therefore assures safety. Further, the degree of degradation of the dialysis membrane is mitigated, and it is sufficient to use a small amount of water for rinsing.

DETAILED DESCRIPTION OF THE INVENTION

Described below are, first, a method for reprocessing a dialyzer according to the present invention, and then an apparatus for reprocessing a dialyzer according to the present invention.

Method for Reprocessing a Dialyzer

The method of the present invention can be carried out for dialyzers conventionally used for hemodialysis treatment, such as a coil-type dialyzer having a tubular membrane wound on a cylindrical member, and a laminate-type dialyzer having accumulated flat membranes. Typically, however, the method of the invention is the most suitable for hollow fiber dialyzers now prevalently used in the art.

Further, the method of this invention can be carried out for dialyzers with dialysis membranes made of various materials, particularly for dialyzers comprising cellulosic membranes such as cuprammonium process cellulose membrane (regenerated cellulose, cuprammonium rayon, cuprophane membranes and saponified membranes), modified cellulose membranes (e.g. cellulose acetate membranes, DEAE cellulose membranes (diethylamino-ethylated cellulose membranes) and like substitution type membranes), membranes of deacetated cellulose, cellulose acetate or the like, membranes of synthetic high molecular substances such as PAN membranes (polyacrylonitrile membranes), PMMA membranes (polymethyl methacrylate membranes), EVAL membranes (ethylene-vinyl alcohol copolymer membranes), PS membranes (polysulfone membranes), polyamide membranes, etc.

Among these dialyzers, there may be mentioned. dialyzers with dialysis membranes such as cellulosic membranes, polysulfone membranes and the like.

Figure 1:
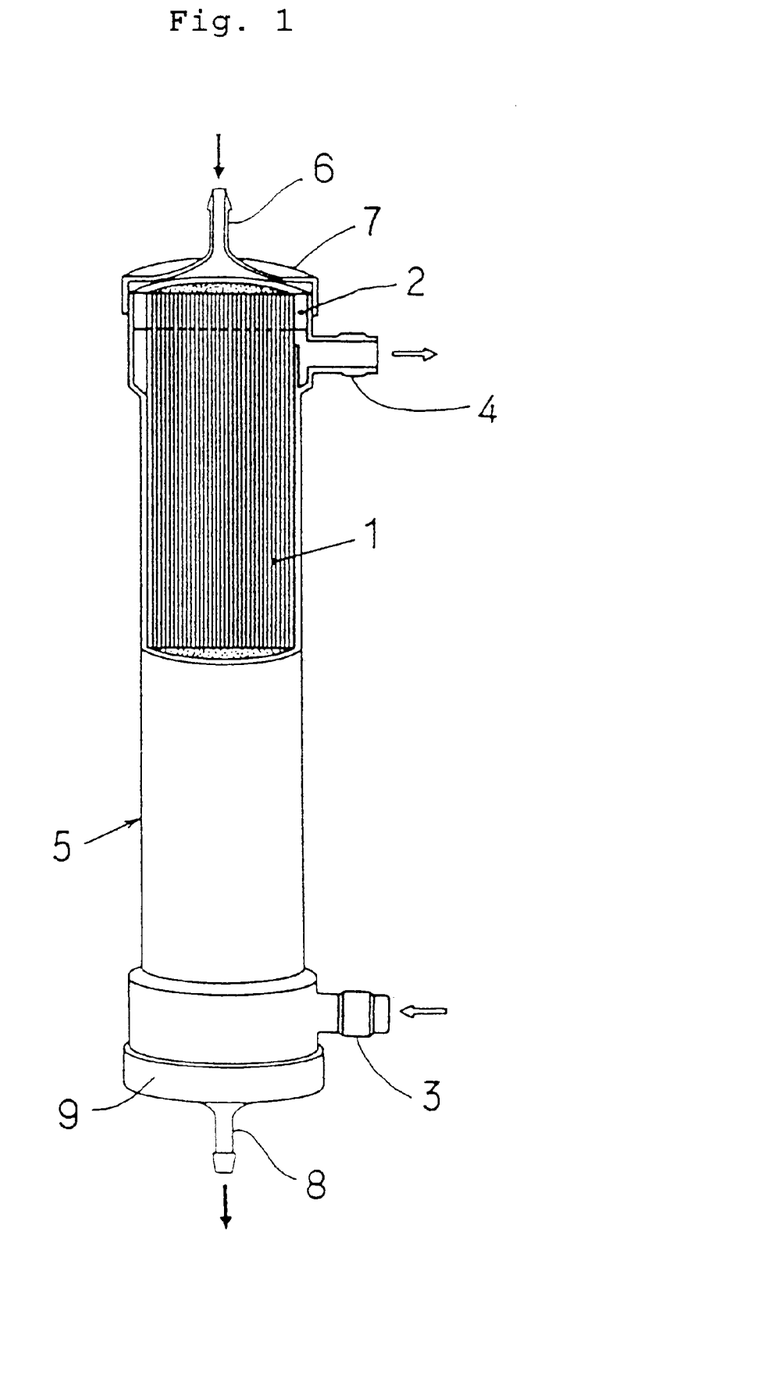
FIG. 1 is a longitudinal view partially in section schematically showing a hollow fiber dialyzer.

A schematic diagram of the hollow fiber dialyzer partially in section is illustrated in FIG. 1. The hollow fiber dialyzer has approximately several thousands to ten thousands of hollow fiber membranes 1 bundled together at their ends with hollow fiber supports 2 and 2' (not shown). The hollow fiber membranes are accommodated in a cylindrical housing 5 having a dialysate inlet port 3 and a dialysate outlet port 4. The hollow fiber supports 2 and 2' provided at both ends of the housing 5 are fixed in a header member 7 having a blood inlet port 6 and in the other header member 9 having a blood outlet port 8.

In the practice of dialysis, usually the blood is introduced from the blood inlet port 6 at an upper portion of the dialyzer and flows downward through the interior of the hollow fiber membranes 1, while the dialysate is introduced from the dialysate inlet port 3 at a lower portion of the housing and flows countercurrent to the direction of the blood flow, over the exterior of the hollow fiber membranes 1. In the dialysis session, the flow rate of the blood is usually about 150 to about 250 ml/min, while the flow rate of the dialysate is usually set to 500 ml/min.

Generally, hollow fibers have an inner diameter of about 200 μm, and a membrane thickness of 6.5 to 15 μm in the case of a cellulosic membrane and 20 to 60 µm in the case of a membrane made of synthetic high molecular substance. In the housing, hollow fibers possess an effective length of 20 to 30 cm and an effective area of about 1.0 to about 2.1 m², and a blood charge (priming volume) of about 40 to about 130 ml.

The method of the present invention can be carried out, for example, as follows, but minor alteration may be made.

In the method of the invention, the dialyzer, which has undergone a preliminary procedure for reprocessing after dialysis treatment, is preferably rinsed with water and cleaned with electrolyzed strongly alkaline water when so required, and then cleaned with water and with electrolyzed strongly acidic water.

(a) Preliminary Procedure

Upon completion of the hemodialysis, blood components remain in the hollow fiber membranes of the dialyzer. This is due to the clogging of the blood compartment of dialyzer or deposition on the membrane surface. Thus, on completion of the hemodialysis, the blood is returned by a conventionally used method, and immediately thereafter the blood compartment of the dialyzer is rinsed with 100 to 500 ml of physiological saline.

After the blood compartment of the dialyzer is cleaned by the removal of blood components, physiological saline is filled into the blood compartment thereof and held in this state. Then the blood circuit attached to the dialyzer is disengaged and the dialyzer is hermetically closed.

On the other hand, with respect to the dialysate compartment of the dialyzer, the dialysate is discharged therefrom after the above rinsing step of the blood compartment. Then the dialysate circuit attached to the dialyzer is detached and the dialyzer is hermetically closed.

With respect to the reprocessing of dialyzers, if a dialyzer used for dialysis of a patient A has been reprocessed, then it is a matter of course to reuse the thus reprocessed dialyzer not for other patient B but for the same patient A from the viewpoint of preventing infection and for other reasons. Therefore, to each of the dialyzers disengaged from the dialysis equipment after hemodialysis treatment, a label should be attached which record information required for identification (patient name, number of reuses, etc.) and the details of cleansing conditions.

The preliminary procedure is completed in this way as described above.

(b) Reprocessing Procedure

In the reprocessing procedure, basically the steps of rinsing with water and cleaning with electrolyzed water are carried out with respect to the dialyzer which has undergone the foregoing preliminary procedure.

Generally, the water to be used in the water-rinsing step is soft water, pure water, reverse osmosis processed water (RO water) or the like which fulfills the requirement that the quantities of bacteria and endotoxins are below the specific levels. However, preferred water for reprocessing a dialyzer is one adequately purified so that the risk of infection is minimized. Usually the use of reverse osmosis processed water (RO water) is more preferred.

The electrolyzed water to be used in the invention is the water obtained by electrolyzing water containing a small amount of sodium chloride in an electrolytic cell partitioned with a diaphragm into an anode chamber and a cathode chamber. Such electrolyzed water is known.

Today various models of electrolyzed water generators are commercially available from a number of manufacturers. Electrodes usually used for electrolyzed water generators include, for example, titanium rods with platinum deposited thereon by coating or baking. Useful diaphragms include, for example, neutral membranes made of polyester or the like. The generators employ electric power ranging from 100 V power for household use to 200 V power for mechanical power, depending on the amount of electrolyzed water to be produced. The conditions for electric current are suitably determined according to the distance between the electrodes, the amount of sodium chloride used and so on. The source of water to be used in preparing electrolyzed water may be tap water but is preferably reverse osmosis processed water (RO water).

The thus obtained electrolyzed water is classified into electrolyzed strongly alkaline water and electrolyzed strongly acidic water ("electrolyzed strongly alkaline water" may be hereinafter simply referred to as "strongly alkaline water" and "electrolyzed strongly acidic water" may be hereinafter simply referred to as "strongly acidic water"). The strongly acidic water is obtained from the anode chamber by electrolysis while the strongly alkaline water is obtained from the cathode chamber by electrolysis.

The strongly alkaline water to be used in the invention has a pH of at least 11 and an oxidation reduction potential (ORP) of about −800 mV. Preferred is strongly alkaline water having a pH of about 11.5 to about 12 and an ORP of about −800 to about −900 mV.

The strongly acidic water to be used in the invention has a pH of up to 2.7, an oxidation reduction potential (ORP) of at least 1100 mV and a dissolved chlorine concentration of about 10 to about 40 ppm. Preferred is strongly acidic water having a pH of about 2.7 to about 2.4, an ORP of about 1100 to about 1150 mV and a dissolved chlorine concentration of about 15 to about 30 ppm.

The electrolyzed strongly acidic water and electrolyzed strongly alkaline water for use in the invention can be any water having the foregoing properties irrespective of the type of electrolyzed water generators and production conditions.

In a first embodiment of the method according to the invention, the blood compartment and dialysate compartment of the dialyzer subjected to said preliminary procedure are rinsed with water, and then cleaned and disinfected with the electrolyzed strongly acidic water.

In accordance with this first embodiment, not only bacteria but also toxins such as endotoxins are removed.

Moreover, in accordance with the first embodiment of the method of the invention, it has been found that the external and internal layers of hollow fiber membranes in the dialyzer are deformed and/or damaged to smaller degrees than cleaning with formalin conventionally used as the cleaning agent.

In a second embodiment (preferred embodiment) of the method according to the invention, the blood compartment and the dialysate compartment of the dialyzer subjected to said preliminary procedure are rinsed with water, cleaned with electrolyzed strongly alkaline water, rinsed with water and cleaned with electrolyzed strongly acidic water.

In this preferred embodiment, namely, second embodiment, proteins can be more effectively removed from any of the blood compartment and the dialysate compartment of the dialyzer by cleaning them with electrolyzed strongly alkaline water, in addition to the effect of the first embodiment comprising the water-rinsing step and strongly acidic water-cleaning step.

Unlike the dialysate compartment which is chiefly contaminated with bacteria, endotoxins and the like, the blood compartment in the dialyzer is contaminated with contaminants derived from blood, such as blood cells (e.g., leukocytes, erythrocytes and the like), plasma components (e.g., platelets, albumins, globulins, metabolites and like serum proteins and coagulation factors). According to the second embodiment of the invention, such contaminants derived from blood can be more effectively removed from the blood compartment (hollow fiber membrane) and, moreover, the hollow fibers are deformed and damaged to smaller degrees, when compared with the reprocessing by formalin conventionally used.

Generally, in any of the first and second embodiments of the present invention, the blood compartment and dialysate compartment of the dialyzer are cleaned by passing therethrough water, strongly acidic water and strongly alkaline water, respectively in the water-rinsing step, the electrolyzed strongly acidic water-cleaning step and electrolyzed strongly alkaline water-cleaning step. For example, water is passed through the dialysate and blood compartments in the water-rinsing steps. Likewise, electrolyzed water is passed through the dialysate and blood compartments in the electrolyzed water-cleaning steps.

Water and electrolyzed water may be passed through the dialysate and blood compartments in either the same direction or the opposite direction. However, since generally the same cleaning agent passes through the dialysate and blood compartments as set forth above, it is convenient from the viewpoint of equipment structure and favorable that direction of the flow in the dialysate compartment is the same as the direction of the flow in the blood compartment.

While the cleaning agents may be passed at either the same flow velocity or different flow velocities through the dialysate and blood compartments in the dialyzer to be reprocessed, generally the same flow velocity is preferred in view of the ease of operation.

There is no restriction on the temperature of water and electrolyzed water to be used for the cleaning. Generally the temperature is preferably about 20 to about 30° C., more preferably about 25 to about 30° C.

The conditions in each step are described below taking the second embodiment as an example.

(1) Water-rinsing Step

Upon completion of the preliminary procedure, the dialysate and blood compartments are rinsed with water in order to remove the remaining dialysate components and blood components from the compartments.

Consequently there is no limitation on the rinsing conditions in this water-rinsing step insofar as they are effective for removing the dialysate components and blood components remaining in the dialyzer. In the case of hollow fiber dialyzers now prevalently used, it is generally sufficient that the two compartments are rinsed with water at a flow velocity of about 100 to about 300 ml/min for about 5 to about 10 minutes, preferably at a flow velocity of about 200 to about 300 ml/min for about 8 to about 10 minutes. Of course, the flow velocity and rinsing time described above may be suitably changed.

(2) Strongly Alkaline Water-cleaning Step

Upon completion of the water-rinsing step, the dialysate and blood compartments in the dialyzer are cleaned with strongly alkaline water.

There is no limitation on the flow velocity of strongly alkaline water and cleaning time insofar as the protein components remaining in the dialysate compartment and/or the blood compartment of the dialyzer, and blood-derived contaminants such as blood cells and plasma components can be removed.

In the case of hollow fiber dialyzers, it is generally sufficient that the two compartments are cleaned with strongly alkaline water at a flow velocity of about 100 to about 300 ml/min for about 2 to about 5 minutes, preferably at a flow velocity of about 200 to about 300 ml/min for about 4 to about 5 minutes. Of course, the flow velocity and cleaning time described above may be suitably changed.

(3) Water-rinsing Step

Upon completion of the strongly alkaline water-cleaning step, the dialysate and blood compartments are rinsed again with water. This rinse is carried out to drive out the strongly alkaline water used in the strongly alkaline water-cleaning step (2) from the lines.

Consequently the rinsing conditions can be any of those under which the water used in this rinsing step can replace the strongly alkaline water remaining in the lines for feeding the strongly alkaline water and in the dialysate and blood compartments of the dialyzer.

In the case of hollow fiber dialyzers, this rinsing step is conducted in view of the ease of operation preferably at a flow velocity of about 100 to about 300 ml/min for about 1 to about 2 minutes, more preferably at a flow velocity of about 200 to about 300 ml/min for about 1 minute.

(4) Strongly Acidic Water-cleaning Step

Next, the dialysate and blood compartments of the dialyzer are cleaned with strongly acidic water.

There is no limitation on the flow velocity of strongly acidic water and cleaning time in the strongly acidic water-cleaning step insofar as sterilization of the blood and dialysate compartments in the dialyzer and inactivation of endotoxins, and particularly removal of the blood-derived contaminants from the blood compartment of the dialyzer can be achieved.

Generally, however, the strongly acidic water-cleaning step is effected at a flow velocity of about 100 to about 300 ml/min for about 2 to about 5 minutes, preferably at a flow velocity of about 200 to about 300 ml/min for about 4 to about 5 minutes. Of course, the flow velocity and cleaning time described above may be suitably changed.

After carrying out the strongly acidic water-cleaning step, the blood and dialysate compartments with the strongly acidic water enclosed therein are hermetically closed at both ends of two compartments and are held in this state until the next hemodialysis session. In this way, the reprocessing of dialyzers according to the invention is completed.

While it is preferred to conduct all of the steps (1) to (4) as described above, the strongly alkaline water-cleaning step (2) and the water-rinsing step (3) may be optionally omitted to carry out only the water-rinsing step (1) and the strongly acidic water-cleaning step (4). In this case, the cleaning conditions in each step are the same as above.

(5) Reverse Filtration

In the present invention, the pores of hollow fiber membranes can be cleaned by the so-called reverse filtration when so required.

During a hemodialysis treatment session, a positive pressure is applied to the blood compartment of the dialyzer or a negative pressure is applied to the dialysate compartment of the dialyzer to bring about a difference in pressure between the blood compartment and the dialysate compartment. Due to this pressure difference, excess water is removed and substances of medium molecular weight are diffused from the blood side to the dialysate side, whereby gradually the membrane pores are clogged.

The reverse filtration is conducted to remove the clogging. Namely, a positive pressure is applied to the dialysate compartment so that water, electrolyzed strongly alkaline water, electrolyzed strongly acidic water or the like is reversely passed from the dialysate compartment to the blood compartment to remove the components responsible for clogging. In other words, the membrane pores are cleaned by application of pressures.

The reverse filtration is conveniently conducted especially in reprocessing hollow fiber dialyzers. The exterior of hollow fiber membranes (dialysate compartment side) is exposed to a higher pressure than the interior of hollow fiber membranes (blood compartment side), whereby the rinsing water or electrolyzed water is passed through the membranes to drive out or inactivate the bacteria, endotoxins, organic substances, blood-derived contaminants and the like remaining in the pores of the hollow fiber membranes.

To conduct the reverse filtration, the pressures inside and outside the hollow fiber membranes may be suitably adjusted by operation of pressure indicators and valves disposed in the line. There is no limitation on the difference between the pressures inside and outside the hollow fiber membranes. Generally the exterior of membranes is exposed to a higher pressure than the interior thereof.

If desired, ordinary filtration which is reverse to the reverse filtration may be conducted.

(6) Pressure Resistance Test

In the case of hollow fiber dialyzers, the hollow fiber membranes may be tested for pressure resistance during or after the reprocessing procedure. The purpose of pressure resistance test is to determine whether the dialyzer can be reused by confirming the absence of break or leak in the membranes.

Generally, the pressure resistance test is carried out by applying a pressure, which is higher than the highest operating pressure by e.g. 20%, to the dialysis membranes, particularly to the blood compartment side (a line for the passage of the cleaning agent for cleaning the blood compartment). If the pressure indicator shows that the pressure loss is not unusually lowered after application of pressure to the blood compartment side, it is considered that the dialyzer can be reused.

The method of the invention can reprocess a single dialyzer by cleaning for reuse or can reprocess a plurality of dialyzers by cleaning at one time for reuse.

Optionally it is possible to clean at one time a blood circuit in the dialysis equipment, namely the blood circuit through which the blood is passed from the blood vessel of a dialysis patient to the dialyzer. In this case, the blood circuit as well as the dialyzer can be reused.

When a dialyzer is cleaned according to the method of the invention, it is possible to remove, for example, blood cells (such as leukocytes, erythrocytes and the like) and plasma components (such as platelets, albumins, globulins, metabolites and like serum proteins and coagulation factors) from the blood compartment (space inside of the hollow fiber membranes in the case of a hollow fiber dialyzer) and to eliminate bacteria, endotoxins, a trace amount of proteins and the like from the dialysate compartment (space inside of the housing in a follow fiber dialyzer).

To reuse the dialyzer thus reprocessed according to the invention with the strongly acidic water enclosed therein in the final strongly acidic water-cleaning step, the enclosed strongly acidic water is driven out with water (preferably RO water). A small amount of water is sufficient for this purpose because the strongly acidic water is inherently safe and can be handled as safely as ordinary water when diluted with a small amount of water. The amount of water to be used for driving out the enclosed strongly acidic water is about 200 to about 1000 ml, preferably about 400 to about 500 ml.

Apparatus for Reprocessing a Dialyzer

The present invention also relate to an apparatus for carrying out the foregoing method for cleaning and disinfecting a dialyzer or for reprocessing a dialyzer.

Figure 2:
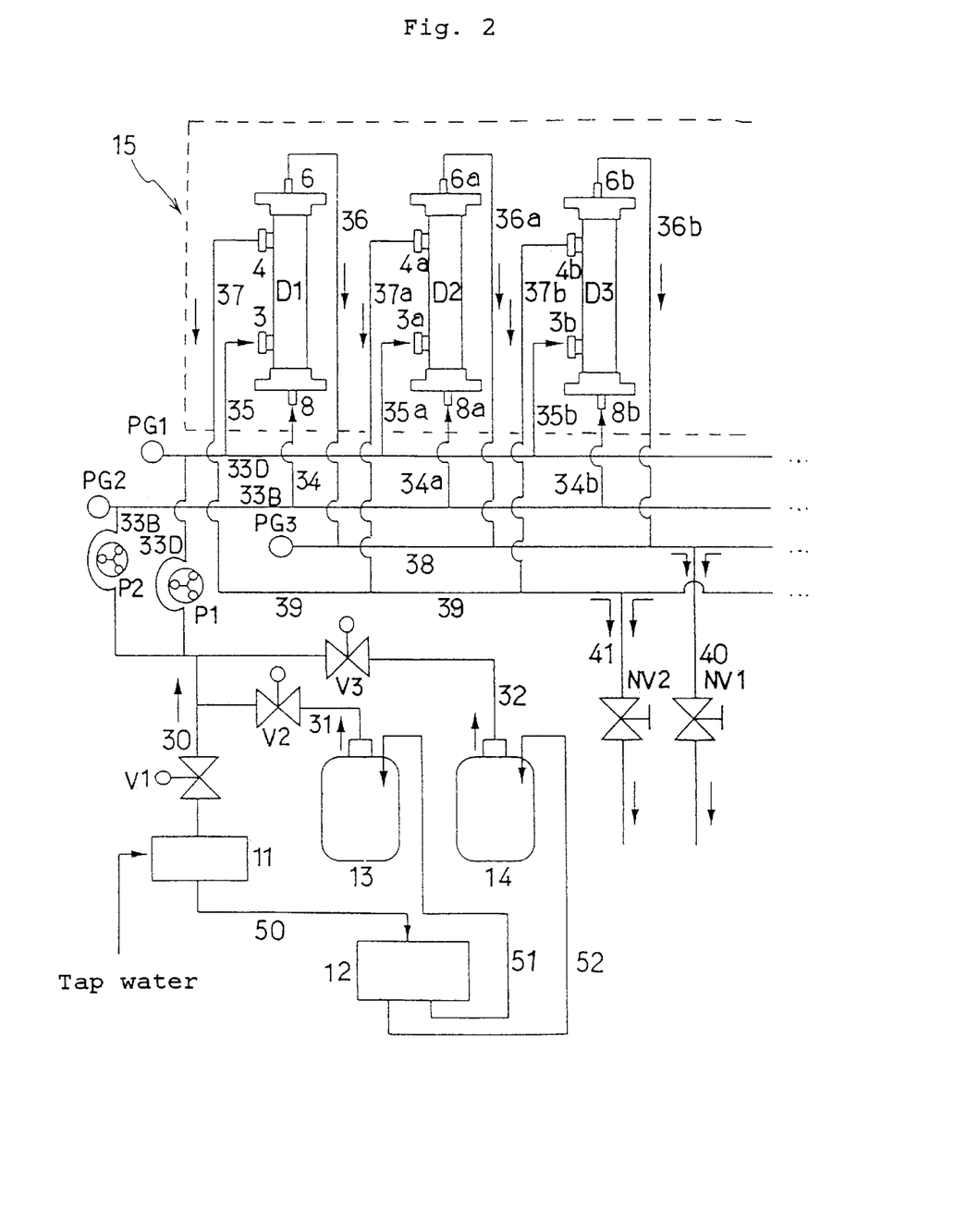
FIG. 2 is a schematic diagram illustrating an embodiment of the apparatus for reprocessing a dialyzer according to the present invention.

An embodiment of the apparatus according to the invention is illustrated in FIG. 2. Described below is the practice of a preferred embodiment of the method according to the invention (i.e. the method comprising the water-rinsing step, strongly alkaline water-cleaning step, water-rinsing step and strongly acidic water-cleaning step), using the reprocessing apparatus of the invention as shown in FIG. 2 to reprocess, by way of example, hollow fiber dialyzers now prevalently used. Like parts of the dialyzer depicted in FIG. 2 are indicated with like or same kinds of reference symbols as used for the parts of the hollow fiber dialyzer as shown in FIG. 1.

A dialyzer D1 to be cleaned and disinfected after conducting the preliminary procedure is fixed to a panel 15 by suitable means (not shown) capable of removably fixing the dialyzer D1. Although three dialyzers are shown in FIG. 2 as being fixed to the panel 15, a single dialyzer or at least 2 dialyzers may be fixed thereto to perform the cleaning and disinfection at the same time.

In FIG. 2, the dialyzers are fixed so that a blood inlet port 6 and a dialysate outlet port 4 are located upside. However, the dialyzers may be fixed so that a blood outlet port 8 and a dialysate inlet port 3 are located upside.

In FIG. 2, the illustrated arrangement is such that the water and electrolyzed water are made to flow in the same direction through the dialysate compartment and blood compartment. Optionally, another arrangement may be adopted in which the water and electrolyzed water are made to travel in opposite directions.

Hereinafter, the method for reprocessing the dialyzer in the fixed state as shown in FIG. 2 is described below for the convenience of clarification.

The apparatus for cleaning or reprocessing dialyzers according to the invention basically has the following features.

First, water (preferably RO water) to be used in the water-rinsing step is placed into a water storage tank 11. When RO water is used as the water, tap water is treated in a RO water generator (not shown) and fed into the water storage tank 11.

Then, the water (preferably RO water) in the water storage tank 11 is transported to an electrolyzed water generator 12 wherein strongly acidic water and strongly alkaline water are produced. The strongly alkaline water and strongly acidic water thus produced are sent to a strongly alkaline water tank 13 and a strongly acidic water tank 14, respectively. Lines 30, 31 and 32 extend from the water storage tank 11, strongly alkaline water tank 13 and strongly acidic water tank 14, respectively.

The electrolyzed water generator 12 need not be connected to the reprocessing apparatus of the invention. In the invention, no problem arises insofar as water (preferably RO water), strongly alkaline water and strongly acidic water can be supplied to the lines 30, 31 and 32, respectively via or not via the water storage tank 11, strongly alkaline water tank 13 and strongly acidic water tank 14, respectively.

However, from the viewpoints of stabilizing the supply of water and electrolyzed water and preventing contamination with bacteria and endotoxins, it is generally advantageous that the electrolyzed water generator 12 is connected to the reprocessing apparatus of the invention as a component of the apparatus and that the water storage tank 11, strongly alkaline water tank 13 and strongly acidic water tank 14 are provided.

That is to say, if desired, the apparatus of the invention may also be provided with the electrolyzed water generator 12 and may be further provided with a line 50 interconnecting the water storage tank 11 and a water supply inlet of the electrolyzed water generator 12; a line 52 interconnecting a discharge outlet of strongly acidic water of the electrolyzed water generator 12 and the electrolyzed strongly acidic water tank 14; and a line 51 interconnecting a discharge outlet of the strongly alkaline water of the electrolyzed water generator 12 and the electrolyzed strongly alkaline water tank 13.

As described above, lines 30, 31 and 32 extend from the water storage tank 11, strongly alkaline water tank 13 and strongly acidic water tank 14, respectively. These lines are connected to inlets of pumps P1 and P2 via valves V1, V2 and V3, respectively. An outlet of the pump P1 is connected to a line 33D, and an outlet of the pump P2 is connected to a line 33B.

The valves V1, V2 and V3 can be of any type insofar as they are capable of opening or closing the lines 30, 31 and 32, respectively. Usually, however, a solenoid valve is preferably used to facilitate automation.

The pump P1 shown in FIG. 2 is the so-called roller pump which allows the cleaning agent to flow in the line 33D out of contact with the mechanical parts of the pump P1. However, the pump may be of other type.

A line 34 branching off from the line 33B is removably connected to the blood outlet port 8 of the dialyzer D1. A line 35 branching off from the line 33D is removably connected to the dialysate inlet port 3 of the dialyzer D1.

A line 36 extends from the blood inlet port 6 of the dialyzer D1 while a line 37 extends from the dialysate outlet port 4 of the dialyzer D1.

When a plurality of dialyzers are fixed to the panel 15 for cleaning and disinfection at the same time, the same arrangement is provided regarding a second dialyzer D2. Namely a line 34a branching off from the line 33B is removably connected to a blood outlet port 8a of the dialyzer D2. A line 35a branching off from the line 33D is removably connected to a dialysate inlet port 3a of the dialyzer D2. A line 36a extends from a blood inlet port 6a of the dialyzer D2 while a line 37a extends from a dialysate outlet port 4a thereof. The same structure is provided regarding a third dialyzer D3 and subsequent dialyzers.

The water or electrolyzed water flowing out from the blood compartment or dialysate compartment of the dialyzer to be cleaned may be discharged, respectively, from the downstream terminal ends of the lines 36, 36a, 36b et seqq and from the downstream terminal ends of the lines 37, 37a, 37b et seqq.

However, preferably the downstream terminal end of the line 36 is connected to a first discharge line 38 from which a discharge line 40 branches out. A valve NV1 is disposed in the discharge line 40. Similarly it is preferred that the downstream terminal end of the line 37 be connected to a second discharge line 39 from which a discharge line 41 branches out and that a valve NV2 be disposed in the discharge line 41.

The valves NV1 and NV2 may be either a solenoid valve or a manual valve.

When a plurality of dialyzers fixed to the panel 15 are cleaned and disinfected at the same time, it is preferable, regarding the second dialyzer D2 and subsequent dialyzers, that each of the downstream terminal ends of the lines 36a et seqq for the passage of cleaning agent flowing out from the blood compartment is connected to the first discharge line 38, and that the cleaning agent is discharged via the branch line 40. Likewise, it is preferable that each of the downstream terminal ends of the lines 37a et seqq for the passage of cleaning agent flowing out from the dialysate compartment is connected to a second discharge line 39, and that the cleaning agent is discharged via the branch line 41.

If desired, a pressure indicator PG1 is disposed in the line 33D extending from the outlet of the pump P1. Likewise a pressure indicator PG2 is disposed in the line 33B extending from the outlet of the pump P2. Further a pressure indicator PG3 is disposed in the first discharge line 38.

In order to reprocess a plurality of dialyzers at one time according to this embodiment, it is preferable that the lines extending from the pumps P1 and P2 to the dialysate compartments and the blood compartments of the respective dialyzers have identical length, or that constant flow valves are placed at suitable positions, so that the same amount of water or electrolyzed water enters the dialysate compartment and the blood compartment of all the dialyzers.

The operation of each step is described below with reference to FIG. 2.

(1) Water-rinsing Step

The dialyzer D1 which has undergone the preliminary procedure is rinsed with water as follows. First the valves V2 and V3 are closed and the valve V1 is opened. Then water (preferably RO water) is made to flow out from the water storage tank 11 by means of the pump P1, and is fed through the lines 33D and 35 and from the dialysate inlet port 3 at a lower portion of the dialyzer D1 into the dialysate compartment, while water is also fed, by means of the pump P2, through the lines 33B and 34 and from the blood outlet port 8 at a lower portion of the dialyzer D1 into the blood compartment, whereby the two compartments in the dialyzer D1 are cleaned with the water passing therethrough.

Thereafter the water passing through the blood compartment may be allowed to flow out from the blood inlet port 6 at an upper portion of the dialyzer and may be discharged from the downstream terminal end of the line 36. Preferably, the downstream terminal end of the line 36 is connected to the discharge line 38 so that the water is discharged from the line 40 branching out from the discharge line 38.

On the other hand, the water passing through the dialysate compartment may be allowed to flow out from the dialysate outlet port 4 at an upper portion of the dialyzer D1 and may be discharged from the downstream terminal end of the line 37. Preferably, the downstream terminal end of the line 37 is connected to the discharge line 39 so that the water is discharged from the line 41 branching out from the discharge line 39.

When a plurality of dialyzers fixed to the panel 15 are simultaneously cleaned and disinfected, the water is made to flow in the same manner as described above regarding the dialyzers D2, D3 and subsequent dialyzers.

There is no limitation on the flow velocity of water and rinsing time insofar as the dialysate components and blood components remaining in the dialyzer can be effectively removed. Generally, the cleaning is carried out at a flow velocity of about 100 to about 300 ml/min for about 5 to about 10 minutes, preferably at a flow velocity of about 200 to about 300 ml/min for about 8 to about 10 minutes. The flow velocity and cleaning time described above may, of course, be properly changed.

(2) Strongly Alkaline Water-cleaning Step

Next, the valves V1 and V3 are closed and the valve 2 is opened. Then, strongly alkaline water is fed from the strongly alkaline water tank 13 by means of the pumps P1 and P2 as done in feeding the rinsing water, and is introduced from the dialysate inlet port 3 and also from the blood outlet port 8 at a lower portion of the dialyzer to pass through the dialysate compartment and the blood compartment, respectively, whereby these compartments are cleaned.

Thereafter the strongly alkaline water passing through the blood compartment may be allowed to flow out from the blood inlet port 6 at an upper portion of the dialyzer and may be discharged from the line 36. Preferably, the strongly alkaline water is discharged from the branch line 40 via the discharge line 38.

The strongly alkaline water passing through the dialysate compartment may be allowed to flow out from the dialysate outlet port 4 at an upper portion of the dialyzer and may be discharged from the line 37. Preferably the strongly alkaline water is discharged from the branching line 41 via the discharge line 39.

The strongly alkaline water is made to flow in the same manner as described above regarding the dialyzers D2, D3 and subsequent dialyzers.

There is no limitation on the flow velocity of strongly alkaline water and cleaning time in the strongly alkaline water-cleaning step insofar as the protein components, blood cells, plasma components and like blood-derived contaminants remaining in the dialyzer can be effectively removed. Generally the cleaning is carried out at a flow velocity of about 100 to about 300 ml/min for about 2 to about 5 minutes, preferably at a flow velocity of about 200 to about 300 ml/min for about 4 to about 5 minutes. Of course, the flow velocity and cleaning time described above may be properly changed.

(3) Water-rinsing Step

Upon completion of cleaning with strongly alkaline water, the valves V2 and V3 are closed and the valve V1 is opened again. Then, the blood compartment and dialysate compartment are rinsed in the same manner as in the rinsing step (1) with water (preferably RO water) supplied from the water storage tank 11.

The rinse is carried out to eliminate from the lines the strongly alkaline water used in the strongly alkaline water-cleaning step (2). Consequently any conditions can be employed in the rinsing step (3) insofar as the water to be used in this step can replace the strongly alkaline water remaining in the lines 33B and 33D, lines 34 and 35 and in the blood and dialysate compartments.

The same applies to the dialyzers D2, D3 and subsequent ones.

From the viewpoint of a simplified mode of operation and the like, the water-rinsing step (3) is carried out preferably at a flow velocity of about 100 to about 300 ml/min for about 1 to about 2 minutes, more preferably at a flow velocity of about 200 to about 300 ml/min for about 1 minute.

(4) Strongly Acidic Water-cleaning Step

Next, the valves V1 and V2 are closed and the valve V3 is opened. Then, the strongly acidic water fed from the strongly acidic water tank 14 is passed through the blood compartment and dialysate compartment, respectively, via the dialysate inlet port 3 and the blood outlet port 8 at a lower portion of the dialyzer in the same manner as in the steps (1)–(3), whereby the two compartments are cleaned.

The strongly acidic water passing through the blood compartment may be allowed to flow out from the blood inlet port 6 at an upper portion of the dialyzer and may be discharged directly from the line 36 or preferably from the line 40 via the discharge line 38.

The strongly acidic water passing through the dialysate compartment may be permitted to flow out from the dialysate outlet port 4 at an upper portion of the dialyzer and may be discharged directly from the line 37 or preferably from the line 41 via the discharge line 39.

The strongly acidic water is made to flow in the same manner as described above regarding the dialyzers D2, D3 and subsequent ones.

There is no limitation on the flow velocity of strongly acidic water and cleaning time in the strongly acidic water-cleaning step insofar as it is possible to sterilize the blood and dialysate compartments in the dialyzer, to inactivate endotoxins, and especially to remove the blood-derived contaminants from the blood compartment. Generally, however, the cleaning with strongly acidic water is conducted at a flow velocity of about 100 to about 300 ml/min for about 2 to about 5 minutes, preferably at a flow velocity of about 200 to about 300 ml/min for about 4 to about 5 minutes. Of course, the flow velocity and cleaning time described above may be properly changed.

Upon completion of the strongly acidic water-cleaning step, the blood and dialysate compartments with the strongly acidic water enclosed therein are hermetically closed at the blood inlet port 6, blood outlet port 8, dialysate inlet port 3 and dialysate outlet port 4. The dialyzer is held in this state until the next hemodialysis session. The reprocessing of the dialyzer according to the invention is completed in this way.

(5) Reverse Filtration

According to the invention, cleaning of the dialysis membrane pores, namely so-called reverse filtration, can be carried out by alternately closing or opening the valves NV1 and NV2 during cleaning using the foregoing reprocessing apparatus.

Generally the reverse filtration is conducted as follows. The exterior of hollow fiber membranes (dialysate compartment side) is exposed to a higher pressure than the interior of hollow fiber membranes (blood compartment side), so that the rinsing water or electrolyzed water is passed through the membrane pores to drive out or inactivate the bacteria, endotoxins, proteins, blood-derived contaminants and the like remaining in the membrane pores. This reverse filtration may be conducted in any of the above steps (1) to (4).

Stated more specifically, when the valve NV1 is opened and the valve NV2 is closed, the pressure inside of the dialysate compartment becomes higher than the pressure inside of the blood compartment in the dialyzers D1, D2, D3 and subsequent dialyzers, whereby reverse filtration takes place. In other words, usual filtration proceeds from the blood compartment to the dialysate compartment during dialysis treatment as described above. Consequently the membrane pores can be more effectively cleaned by reversely conducting the filtration.

(6) Pressure Resistance Test

In the case of hollow fiber dialyzers, the hollow fiber membranes can be tested for pressure resistance during or after the reprocessing procedure.

The pressure resistance test can be conducted using pressure detectors PG1, PG2 and PG3 shown in FIG. 2. Stated more specifically, the valve NV1 is closed, and a pressure, which is higher than the highest operating pressure by e.g. 20%, is applied by the pump P2 to the lines for the passage of cleaning agent for cleaning the blood compartment. Subsequently the pump P2 is brought to a stop. In terms of the pressure loss (drop) detected by the pressure detectors PG2 and PG3 disposed in the line, it is confirmed whether the pressure loss has been unusually dropped.

EXAMPLES

The present invention is described below in more detail with reference to the following examples.

The electrolyzed water used as the cleaning agent in the following examples and test examples was prepared by adding a small amount of sodium chloride to RO water and electrolyzing the solution using a commercially available electrolyzed water generator. The obtained electrolyzed strongly alkaline water had a pH of 11.0 and an ORP of −800 mV, while the obtained electrolyzed strongly acidic water had a pH of 2.5, an ORP of 1120 mV and a dissolved chlorine concentration of 15 ppm.

In the following examples, comparative examples and test examples, the water used in the water-rinsing steps is RO water prepared using a reverse osmosis apparatus.

Example 1

Dialyzers were reprocessed using the reprocessing apparatus as shown in FIG. 2.

The dialyzers used herein are cellulose acetate membrane-type hollow fiber dialyzers (Nipro Co., Ltd., trade name "FB-150A").

(a) Simulated Dialysis

The whole blood for transfusion was fed from a blood inlet port of the dialyzer at a flow velocity of 200 ml/min and at a liquid temperature of 38° C. and was discharged from a blood outlet port, while a commercially available dialysate (product of Shimizu Pharmaceutical Co., Ltd., trade name "AK SOLITA") was fed, counter-current to the direction of the blood flow, from a dialysate inlet port of the dialyzer at a flow velocity of 500 ml/min and at a liquid temperature of 38° C., and was discharged from a dialysate outlet port. In this way, the simulated dialysis was conducted for 240 minutes.

The whole blood for transfusion was circulated through a closed circuit formed by connecting the blood inlet port and the blood outlet port.

Upon completion of the above procedure, 500 ml of a physiological saline was fed through the blood compartment of the dialyzer to finish the preliminary procedure.

(b) Reprocessing Procedure

A single dialyzer which underwent the preliminary procedure in this way was fixed upright with the blood inlet port positioned on the upside. Under the following conditions, the cleaning agents were passed through the blood and dialysate compartments in the same direction from the downside to the upside, whereby the two compartments were cleaned and disinfected to reprocess the dialyzer.

1) Water-rinsing step
   Flow velocity 200 ml/min, rinsing time 10 minutes
2) Strongly alkaline water-cleaning step
   Flow velocity 200 ml/min, cleaning time 5 minutes
3) Water-rinsing step
   Flow velocity 200 ml/min, rinsing time 1 minute
4) Strongly acidic water-cleaning step
   Flow velocity 200 ml/min, cleaning time 5 minutes Upon completion of the strongly acidic water-cleaning step 4) above, the dialyzer was left to stand for two days with the strongly acidic water enclosed therein. Then, RO water was fed at a flow velocity of 200 ml/min for 1 minute to drive out the strongly acidic water. Immediately thereafter, an in vitro membrane performance evaluation was carried out by the method described in (c) below.

(c) In vitro Membrane Performance Evaluation

The in vitro membrane performance evaluation was conducted as follows. Using a mixture of a usual dialysate and UN (urea nitrogen) as a substitute for blood, a dialysis was carried out by countercurrently passing usual dialysate. Thereafter the clearance was measured.

Stated more specifically, to the commercially available dialysate was added 100 mg/dl of UN (urea nitrogen: actually urea was added, 100 mg/dl of UN=214 mg/dl of urea), 10 mg/dl of CRE (creatinine) and 8 mg/dl of UA (uric acid). The resulting mixture was fed from the blood inlet port of said dialyzer, which had been subjected to the above reprocessing procedure, at a flow velocity of 200 ml/min, and was discharged from the blood outlet port. The commercially available dialysate (free of UN, CRE and UA) was fed, countercurrent to the direction of the flow of said mixture, from the dialysate inlet port of the dialyzer at a flow velocity of 500 ml/min and at a liquid temperature of 38° C., and was discharged from the dialysate outlet port. Both the dialysate containing UN, creatinine and uric acid and the dialysate free of them were passed only once (single pass) without reuse.

The clearance was measured every 30 minutes for 120 minutes from the start of the experiment, namely 4 times in total.

The concentrations of UN, CRE and UA were measured at two points, i.e. the blood inlet port and the blood outlet port of the dialyzer. The clearance was calculated by the following equation.

$$\text{Clearance} = [(CBi - CBo)/CBi] \times QB$$

wherein CBi represents the concentration at the inlet port of the dialyzer, CBo represents the concentration at the outlet port of the dialyzer, and QB represents the flow rate at the blood side for 1 minute.

In determining the clearance, measurement was carried out in 30, 60, 90 or 120 minutes, and the average value of the clearance was calculated.

(d) A Cycle Consisting of the Procedures set Forth in (a), (b) and (c) was Repeated 4 Times (4 Cycles) in Total.

Specifically, after measurement of clearance by the procedure (c), the dialyzer was subjected to simulated dialysis for the second time and subsequent time according to the procedure (a), and was reprocessed for the second time or subsequent time according to the procedure (b). The reprocessed dialyzer was left to stand for two days, and the clearance was measured in the same manner as the procedure (c) for in vitro membrane performance evaluation. In this manner, the cycle consisting of simulated dialysis, dialyzer reprocessing and in vitro membrane performance evaluation was repeated 4 times in total.

The results of clearance measurement obtained at each cycle are shown below in Table 1.

Comparative Example 1

The cellulose acetate membrane-type hollow fiber dialyzer (Nipro Co., Ltd., trade name "FB-150A") was also used in Comparative Example 1.

Using 4% formalin as the cleaning disinfectant, simulated dialysis, dialyzer reprocessing and in vitro membrane performance evaluation were carried out in the same manner as in Example 1 except that the reprocessing procedure was carried out under the following feeding conditions.

1) RO water-rinsing step
   Flow velocity 200 ml/min, rinsing time 10 minutes
2) 4% formalin-cleaning step
   Flow velocity 200 ml/min, cleaning time 1 minute Upon completion of the 4% formalin-cleaning step 2) above, the dialyzer was left to stand for two days with the 4% formalin enclosed therein. Then, RO water was fed at a flow velocity of 200 ml/min for 60 minutes to drive out the formalin.

The results of clearance measurement are shown in Table 1.

TABLE 1

| Cleaning disinfectant | Component | Clearance (ml/min) Number of simulated dialysis and reprocessing procedures | | | |
|---|---|---|---|---|---|
| | | First time | Second time | Third time | Fourth time |
| Strongly alkaline water + Strongly acidic water | UN | 187 | 187.9 | 192.8 | 190.1 |
| | CRE | 171.2 | 167.3 | 189.6 | 168.7 |
| | UA | 159.2 | 158.2 | 169.7 | 163 |
| Formalin | UN | 192.7 | 175.8 | 161.2 | 155.2 |
| | CRE | 166.3 | 152.4 | 135.1 | 128.4 |
| | UA | 157.1 | 139.8 | 120 | 116.1 |

Figure 3:
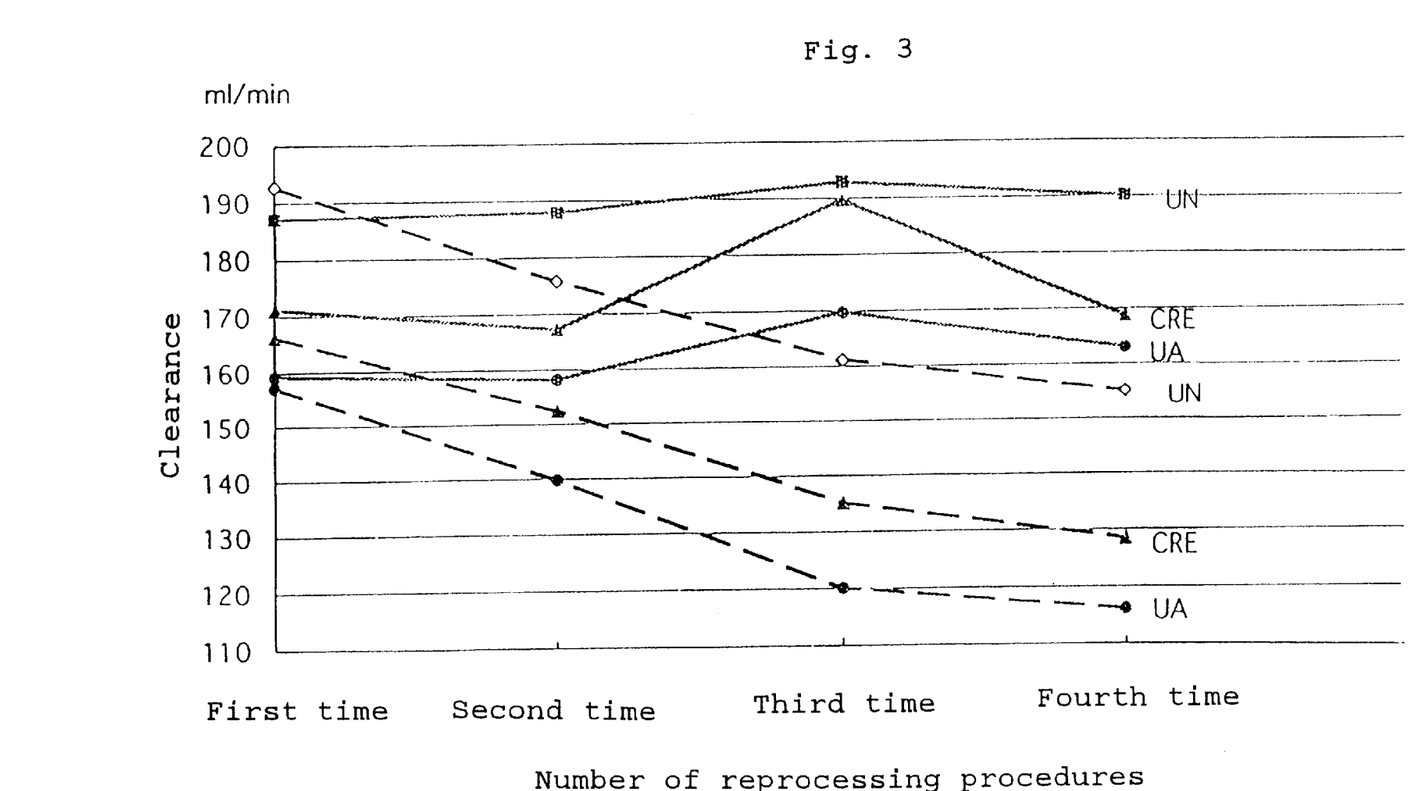
FIG. 3 is a graph showing the results of the clearance measurement in Example 1 and Comparative Example 1 (results of Table 1). The solid lines indicate the results of Example 1 and the broken lines show the results of Comparative Example 1.

The results of Table 1 as plotted in a graph are shown in FIG. 3. In FIG. 3, the solid lines show the results of Example 1 (cleaning with electrolyzed strongly alkaline water+ electrolyzed strongly acidic water) and the broken lines represent the results of Comparative Example 1 (cleaning with formalin).

As clear from Table 1 and FIG. 3, the reprocessing of dialyzers with formalin resulted in a decrease in the clearance with an increase in the number of reprocessing, whereas the reprocessing of dialyzers with electrolyzed strongly alkaline water and electrolyzed strongly acidic water according to the invention shows substantially no decrease in the clearance even when the reprocessing procedure was repeated 4 times.

This demonstrates that the electrolyzed water is effective for removing the blood components such as serum proteins and coagulation factors adhered to the membranes. Thus it is clear that a high dialysis efficiency is achieved by the dialyzers reprocessed by the method of the invention which retain the membrane performance, compared with conventional reprocessing methods using formalin.

Example 2

The effect of reprocessing with strongly acidic water was evaluated using a cellulose acetate membrane-type hollow fiber dialyzer (Nipro Co., Ltd., trade name "FB-150A") used for dialysis treatment of a dialysis patient for 4 hours.

Stated more specifically, 500 ml of a physiological saline was fed to the above dialyzer to remove blood components and the like. Then, the dialyzer was reprocessed in the same manner as in Example 1 (b) except that only the strongly acidic water used in Example 1 was used as the cleaning disinfectant and that the following feeding conditions were employed in the reprocessing procedure.

1) Water-rinsing step
   Flow velocity 200 ml/min, rinsing time 10 minutes
2) Strongly acidic water-cleaning step
   Flow velocity 200 ml/min, cleaning time 5 minutes Upon completion of the strongly acidic water-cleaning step described in 2) above, the dialyzer was left to stand for 24 hours with the strongly acidic water enclosed therein. Then, RO water was fed at a flow velocity of 200 ml/min for 1 minute to drive out the strongly acidic water.

The clearance was measured by the method set forth in Example 1 (c) regarding this dialyzer which underwent the reprocessing procedure only once.

To investigate the change of clearance with time, the clearance was measured 30, 60, 90 and 120 minutes after the start of the in vitro experiment for evaluation of membrane performance.

The results are shown in Table 2.

TABLE 2

| | Clearance (ml/min) | | | | |
|---|---|---|---|---|---|
| | Time (min) | | | | |
| Component | 30 | 60 | 90 | 120 | Average |
| UN | 182.7 | 183.7 | 183.2 | 184.3 | 183.5 |
| CRE | 160 | 162.2 | 162.5 | 164.9 | 162.4 |
| UA | 147.5 | 148.3 | 148 | 151.1 | 148.7 |

Test Example 1

Observation of the Surface of Reprocessed Membrane (1) Observed under an electron microscope was the internal surface of hollow fiber membranes of a polysulfone type, high-flux hollow fiber dialyzers (product of Kawazumi Kabushiki Kaisha, trade name "PS-1.6 VW") and cellulosic low-flux hollow fiber dialyzers (product of Nipro Co., Ltd., trade name "FB-150A"), each of the dialyzers having been subjected to dialysis operation and reprocessing procedure.

Stated more specifically, the dialyzers used in dialysis treatment of a dialysis patient were reprocessed according to the procedure of Example 1 (b) under the following feeding conditions.

1) RO water-rinsing step
   Flow velocity 200 ml/min, rinsing time 10 minutes
2) Strongly alkaline water-cleaning step
   Flow velocity 200 ml/min, cleaning time 5 minutes
3) Water-rinsing step
   Flow velocity 200 ml/min, cleaning time 1 minute
4) Strongly acidic water-cleaning step
   Flow velocity 200 ml/min, cleaning time 5 minutes Upon completion of the strongly acidic water-cleaning step described in 4) above, the dialyzer was left to stand for 2 days with the strongly acidic water enclosed therein. Then, RO water was fed at a flow velocity of 200 ml/min for 1 minute to drive out the strongly acidic water.

After taking out one of the hollow fiber membrane tubes from the central part of the reprocessed dialyzers, one end of the membrane tube was cut at an acute angle to expose the interior of the hollow fiber for observation under a scanning electron microscope (c group).

(2) Dialyzers of the above two types used in dialysis treatment of a dialysis patient were reprocessed by the procedure of Example 1 (b) under the following feeding conditions.

1) RO water-rinsing step
   Flow velocity 200 ml/min, cleaning time 10 minutes
2) Strongly acidic water-cleaning step
   Flow velocity 200 ml/min, cleaning time 5 minutes Upon completion of the strongly acidic water-cleaning step described in 2) above, the dialyzer was left to stand for 2 days with the strongly acidic water enclosed therein. Then, RO water was fed at a flow velocity of 200 ml/min for 1 minute to drive out the strongly acidic water.

After taking out one of the hollow fiber membrane tubes from the central part of the reprocessed dialyzers, one end of the membrane tube was cut at an acute angle to expose the interior of the hollow fiber for observation under a scanning electron microscope (b group).

(3) For comparison, under a scanning electron microscope, observation was made of the internal surfaces of: a hollow fiber tube of the dialyzer used in dialysis treatment of a dialysis patient and then rinsed with RO water alone (a group), a hollow fiber tube of the dialyzer which had been used in dialysis treatment of a dialysis patient, rinsed with RO water, cleaned with 4% formalin and rinsed with RO water (d group), and a hollow fiber tube of a new dialyzer (control).

The cleaning was conducted by the procedure of Example 1 (b) under the following feeding conditions.

i) Rinsing With RO Water Alone

RO water-rinsing step

Flow velocity 200 ml/min, cleaning time 10 minutes ii) Rinsing With RO Water, Cleaning With 4% Formalin and Rinsing With RO Processed Water 1) RO water-rinsing step Flow velocity 200 ml/min, cleaning time 10 minutes 2) 4% Formalin-cleaning step Flow velocity 200 ml/min, cleaning time 1 minute Upon completion of the 4% formalin-cleaning step described in 2) above, the dialyzer was left to stand for two days with the 4% formalin enclosed therein. Then, RO water was fed at a flow velocity of 200 ml/min for 60 minutes to drive out the formalin.

(4) The results of observation under an electron microscope are shown in Table 3.

The term "biological contaminant" used in Table 3 refers to blood cells, plasma components and the like. The term "physical contaminant" used therein refers to substances unrecognizable under an electron microscope and broken pieces generated when the dialyzer tube was cut. The letter "H" is short for a high-flux dialyzer and the letter "L" is short for a low-flux dialyzer.

tively removed from the membranes. This fact is supported by the results of the membrane process evaluation in terms of clearance shown in Table 1. Consequently, in view of the advantage of maintaining the integrity of the hollow fiber membranes, the reprocessing procedure by means of electrolyzed strongly acidic water and electrolyzed strongly alkaline water suppresses the decrease in the dialysis efficiency, and is therefore expected to prevent the reduction of dialysis efficiency and to increase the number of reprocessing.

When dialyzers are reprocessed by cleaning and disinfection with electrolyzed strongly acidic water (b group), hollow fiber membranes were less deformed, and biological and physical contaminants were deposited on the membranes at a comparable level, when compared with the reprocessing by cleaning and disinfection with formalin.

Test Example 2

Evaluation of Effects of Sterilization and Inactivation of Endotoxins

Effects of sterilization and endotoxin inactivation achieved by the cleaning agent enclosed in a dialyzer were evaluated. Stated more specifically, a dialyzer used for dialysis treatment of a dialysis patient was reprocessed according to the procedure of Example 1 (b) under the following feeding conditions.

(i) Reprocessing With Strongly Acidic Water

1) Water-rinsing step

Flow velocity 200 ml/min, cleaning time 10 minutes

2) Strongly acidic water-cleaning step

Flow velocity 200 ml/min, cleaning time 5 minutes

TABLE 3

| Procedure | Dialyzer | Deformation | | | Degree of deposition of contaminant | |
|---|---|---|---|---|---|---|
| | | Tip | Outer layer | Inner layer | Biological contaminant | Physical contaminant |
| Control group | H | None | None | None | – | ± |
| | L | None | None | None | – | ± |
| a group | H | None | None | None | + | + |
| (RO water alone) | L | Found | Found | Found | + to ++ | + to ++ |
| b group (RO water → strongly acidic water → RO water) | H | Few | Few | Few | ± to + | ± to + (*1) |
| | L | Found | Found | Found | + to ++ | ± to + (*1) |
| c group (RO water → strongly alkaline water → RO water → strongly acidic water → RO water) | H | Few | Few | Few | ± | ± |
| | L | Some | Some | Some | ± to + | ± to + |
| d group (RO water → formalin → RO water) | H | Found | Found | Found | + | + to ± (*2) |
| | L | Found | Found | Found | + | + to ++ |

Note:
*1: noticeable contamination of surface
*2: Crystalloid pattern

As apparent from Table 3, when dialyzers were reprocessed by cleaning and disinfection with electrolyzed strongly acidic water and electrolyzed strongly alkaline water (c group), hollow fiber membranes were less deformed, and the biological and physical contaminants were deposited to a lesser degree on membranes, as compared with reprocessing by cleaning and disinfection with formalin. This shows that the relatively less degree of degradation of the hollow fiber membranes was caused by the reprocessing procedure and that the blood components such as serum proteins and coagulation factors were effec- Upon completion of practice of the strongly acidic water-cleaning step described in 2) above, the dialyzer was left to stand for 48 hours with the strongly acidic water enclosed therein.

(ii) Reprocessing with Strongly Alkaline Water and Strongly Acidic Water

1) RO water-rinsing step

Flow velocity 200 ml/min, cleaning time 10 minutes

2) Strongly alkaline water-cleaning step

Flow velocity 200 ml/min, cleaning time 5 minutes

3) Water-rinsing step

Flow velocity 200 ml/min, cleaning time 1 minute

4) Strongly acidic water-cleaning step

Flow velocity 200 ml/min, cleaning time 5 minutes

Upon completion of the strongly acidic water-cleaning step described in 4) above, the dialyzer was left to stand for 48 hours with the strongly acidic water enclosed therein.

(iii) Reprocessing With Formalin

1) RO water-rinsing step

Flow velocity 200 ml/min, cleaning time 10 minutes 2) 4% formalin-cleaning step

Flow velocity 200 ml/min, cleaning time 1 minute

Upon completion of the formalin-cleaning step described in 2) above, the dialyzer was left to stand for 48 hours with the 4% formalin enclosed therein.

After each cleaning disinfectant enclosed in the dialyzer was left to stand for 48 hours, RO water was fed at a flow velocity of 200 ml/min for 1 minute in the reprocessing procedures (i) and (ii), and at a flow velocity of 200 ml/min for 60 minutes in the reprocessing procedure (iii). Then, the remaining RO water was collected from the blood compartment (inside) and the dialysate compartment (outside) of the dialyzer to measure bacteria count and determine the content of endotoxins.

The test for absence or presence of bacteria was carried out by a plate agar method. The endotoxin content was determined by an endospecy method (synthetic substrate method) after a test for addition and collection of cleaning disinfectant.

The same experiment was repeated three times. The results of the first, second and third runs are shown in Table 4. In Table 4, the abbreviation "ET" stands for endotoxin and the abbreviation "EU" stands for endotoxin unit.

This means that various substances in blood components deposited on the membranes have been satisfactorily removed by cleaning with electrolyzed water, and this fact is also supported by the observation that less contaminants were found on the membrane surface under a scanning electron microscope.

After the dialyzer was left to stand with strongly acidic water enclosed therein following the completion of reprocessing procedure, no bacterium was found in the dialyzer and a low endotoxin content was shown.

EFFECTS OF THE INVENTION

According to the first embodiment of the method of the invention (method comprising rinsing with water and cleaning with strongly acidic water), not only the membranes are sterilized but also toxins such as endotoxins are inactivated.

Furthermore, according to the first embodiment of the method of the invention, the outer and inner layers of hollow fiber membranes of a dialyzer are deformed and damaged to less degrees than when formalin, the conventional cleaning agent, is used.

According to the second embodiment of the method of the invention, the following effects can be produced in addition to the effect of the first embodiment. That is, the cleaning with electrolyzed strongly alkaline water can remove proteins more effectively from any of the blood and dialysate compartments of the dialyzer, and moreover can eliminate biological and physical contaminants more effectively from the blood compartment (hollow fiber membrane) while the hollow fiber membranes of the dialyzer are deformed or damaged in mitigated degrees.

To reuse the dialyzer reprocessed in the present invention and having the strongly acidic water enclosed in the final

TABLE 4

| Cleaning disinfectant | Endotoxins and bacteria to be removed | Experiment 1 | | Experiment 2 | | Experiment 3 | |
|---|---|---|---|---|---|---|---|
| | | Inside | Outside | Inside | Outside | Inside | Outside |
| Strongly acidic water | ET (EU/L) | 48.1 | 35.2 | 43.5 | 25.2 | 5.7 | 14.9 |
| | Bacteria (cfu/ml) | Negative | Negative | Negative | Negative | Negative | Negative |
| Strongly alkaline water + strongly acidic water | ET (EU/L) | 84.1 | 4.4 | 18.6 | 6.3 | 21.6 | 5 |
| | Bacteria (cfu/ml) | Negative | Negative | Negative | Negative | Negative | Negative |
| Formalin | ET (EU/L) | 278 | 134 | 298 | 112 | 311 | 151 |
| | Bacteria (cfu/ml) | Negative | Negative | Negative | Negative | Negative | Negative |

As seen from the results shown in Table 4, endotoxins can be more effectively inactivated by cleaning and disinfection with strongly acidic water or with strongly alkaline water and strongly acidic water according to the invention than with formalin.

The following can be seen from the results of Tables 1, 2, 3 and 4 as a whole. When dialyzers are reprocessed with electrolyzed water according to the invention, decrease in the clearance and other properties of dialyzers can be inhibited well, and favorable properties can be retained, when compared with the reprocessing with formalin conventionally used.

The performance of dialyzers is kept from deterioration as much as possible, as seen from comparison with the manufacturer's stated values.

cleaning step, the enclosed strongly acidic water is driven out by water (preferably RO water). A very small amount of water is sufficient for this purpose, since strongly acidic water is safe itself and can be handled as easily as ordinary water on dilution with a small amount of water.

Using electrolyzed water according to the invention, a dialyzer can be cleaned and disinfected more effectively than when cleaned with formalin.

The cleaning can remove substances deposited on the membranes more effectively, and membrane is less degraded, resulting in enhanced retention of membrane performance.

Furthermore, concerning the issue of biocompatibility, the activation of complement, for example, is a bioreaction which occurs when the blood contacts with the dialyzer membranes. The activation of complement system (C3, C3a or the like) causes a reaction of white blood cells (mainly granulocytes), and the cells are temporarily deposited in the pulmonary blood vessels or deposited on endothelial cells, resulting in development of transient leukopenia which induces ventilatory disorder and other diseases. Noticeable activation of complement occurs especially with cellulosic membranes.

Reportedly biocompatibility is additionally affected by coagulation factors, monocytes (a species of white blood cell) or macrophages (cells which form the base of endothelial cells; large-size monocytes). It is said that when dialysis membranes are reprocessed with conventional cleaning disinfectants, blood components such as serum proteins or the like are deposited on the membrane surface, so that complement activation is unlikely to occur, resulting in an increase in biocompatibility. However, this phenomenon is responsible for impairment of membrane performance.

Highly biocompatible membranes are more frequently used in recent years. Therefore it is now more important to maintain the inherent performance of membranes as long as possible by removing the blood components such as serum protein and the like from the membranes. From this viewpoint, the cleaning and disinfection with electrolyzed water according to the invention can effectively remove the serum proteins, coagulation factors and the like from the membrane surface. Consequently the cleaning and disinfecting method using electrolyzed water is suitable for reprocessing a dialyzer.

INDUSTRIAL APPLICABILITY

As described above, the method and the apparatus of the invention can reprocess dialyzers for hemodialysis with advantages and safety.

What is claimed is:

1. A method for reprocessing a hollow fiber dialyzer for hemodialysis disengaged from the dialysis equipment after hemodialysis treatment, the method comprising the steps of:
   (a) rinsing both a blood compartment and a dialysate compartment of said hollow fiber dialyzer with water, and
   (b) cleaning both compartments with electrolyzed strongly acidic water,
       wherein clearance values, expressed in ml/min, of said hollow fiber dialyzer remain substantially the same after repeated reprocessing and reuse.

2. A method for reprocessing a hollow fiber dialyzer for hemodialysis disengaged from the dialysis equipment after hemodialysis treatment, the method comprising the steps of rinsing both a blood compartment and a dialysate compartment of said hollow fiber dialyzer with water, cleaning both compartments with electrolyzed strongly alkaline water, rinsing the compartments with water and cleaning the compartments with electrolyzed strongly acidic water whereby clearance values, expressed in ml/min, of said hollow fiber dialyzer remain substantially the same after repeated reprocessing and reuse.

3. The method according to claim 1, wherein the electrolyzed strongly acidic water has a pH of about 2.7 to about 2.4, an oxidation reduction potential of about 1100 to about 1150 mV and a dissolved chlorine concentration of about 15 to about 30 ppm.

4. The method according to claim 1, wherein while the dialysate and the blood compartments are both cleaned and disinfected sequentially with water and electrolyzed strongly acidic water, the direction of the flow in the blood compartment of the dialyzer is the same as the direction of the flow in the dialysate compartment thereof, and the membrane pores of the hollow fiber dialyzer are also cleaned by reverse filtration.

5. A method for reprocessing a hollow fiber dialyzer for hemodialysis disengaged from the dialysis equipment after hemodialysis treatment, the method comprising the steps of rinsing both a blood compartment and a dialysate compartment of said hollow fiber dialyzer with water, cleaning both compartments with electrolyzed strongly alkaline water, rinsing the compartments with water and cleaning the compartments with electrolyzed strongly acidic water wherein clearance values, expressed in ml/min, of said hollow fiber dialyzer remain substantially the same after repeated reprocessing and reuse.

6. The method according to claim 5, wherein the electrolyzed strongly alkaline water has a pH of at least 11 and an oxidation reduction potential of about −800 mV, and the electrolyzed strongly acidic water has a pH of 2.7 or lower, an oxidation reduction potential of at least 1100 mV and a dissolved chlorine concentration of about 10 to about 40 ppm.

7. The method according to claim 5, wherein the electrolyzed strongly alkaline water has a pH of about 11.5 to about 12 and an oxidation reduction potential of about −800 to about −900 mV and the electrolyzed strongly acidic water has a pH of about 2.7 to about 2.4, an oxidation reduction potential of about 1100 to about 1150 mV and a dissolved chlorine concentration of about 15 to about 30 ppm.

8. The method according to claim 5, wherein while the dialysate and blood compartments are both cleaned and disinfected sequentially with water, electrolyzed strongly alkaline water, water and electrolyzed strongly acidic water, the direction of the flow in the blood compartment of the dialyzer is the same as the direction of the flow in the dialysate compartment thereof, and the membrane pores of the hollow fiber dialyzer are also cleaned by reverse filtration.

9. An apparatus for reprocessing a hollow fiber dialyzer for hemodialysis disengaged from hemodialysis equipment after hemodialysis treatment, the apparatus comprising:
   (a) a tank for holding electrolyzed strongly alkaline water,
   (b) a tank for holding electrolyzed strongly acidic water,
   (c) a tank for holding water,
   (d) two pumps,
   (e) lines extending from the three tanks and connected to respective inlets of the two pumps,
   (f) valves disposed in respective lines (e) upstream of the pumps,
   (g) a line which removably connects an outlet of one of the two pumps to a dialysate inlet port of the hollow fiber dialyzer to be cleaned or to a dialysate outlet port thereof,
   (h) a line which removably connects an outlet of the other of the two pumps to a blood inlet port of the hollow fiber dialyzer to be cleaned or to a blood outlet port thereof,
   (i) a line removably connected to the blood inlet port of the hollow fiber dialyzer or to the blood outlet port thereof, the line being disposed for the discharge of the water, electrolyzed strongly alkaline water or electrolyzed strongly acidic water flowing out from the blood compartment of the hollow fiber dialyzer, and
   (j) a line removably connected to the dialysate inlet port of the hollow fiber dialyzer or to the dialysate outlet port thereof, the line being disposed for the discharge of the water, electrolyzed strongly alkaline water or electrolyzed strongly acidic water flowing out from the dialysate compartment of the hollow fiber dialyzer.

10. The apparatus according to claim 9, which further comprises:
(k) a first discharge line connected to the downstream terminal end of the line as defined in (i) for the discharge of the water, electrolyzed strongly alkaline water or electrolyzed strongly acidic water flowing out from the blood compartment of the dialyzer,
(l) a line branching out from the first discharge line,
(m) a second discharge line connected to the downstream terminal end of the line disposed as defined in (j) for the discharge of the water, electrolyzed strongly alkaline water or electrolyzed strongly acidic water flowing out from the dialysate compartment of the dialyzer, and
(n) a line branching out from the second discharge line, wherein a valve is disposed in each of said line branching out from the first discharge line and said line branching out from the second discharge line.

11. The apparatus according to claim 9 or 10, which further comprises an electrolyzed water generator and is further provided with a line connecting the water tank to a water supply port of the electrolyzed water generator, a line connecting a discharge port for electrolyzed strongly acidic water of the generator to the tank for holding electrolyzed strongly acidic water, and a line connecting a discharge port for electrolyzed strongly alkaline water of the generator to the tank for holding electrolyzed strongly alkaline water.

12. A method for reprocessing a hollow fiber dialyzer for hemodialysis, the method comprising the steps of:

(A) rinsing both a blood compartment and a dialysate compartment of said hollow fiber dialyzer with reverse osmosis processed water,
(B) cleaning said compartments with electrolyzed strongly alkaline water,
(C) rinsing said compartments with water,
(D) cleaning said compartments with electrolyzed strongly acidic water, and
(E) hermetically sealing said compartments with said electrolyzed strongly acidic water enclosed therein;
wherein clearance values, expressed in ml/min, of said hollow fiber dialyzer remain substantially the same after repeated reprocessing and reuse.

13. The method of claim 12 wherein said electrolyzed strongly acidic water has a pH of 2.7 or lower, an oxidation reduction potential of at least 1100 mV and a dissolved chlorine concentration of about 10 to about 40 ppm, and wherein said electrolyzed strongly alkaline water has a pH of at least 11 and an oxidation reduction potential of about −800 mV.

14. The method of claim 12, wherein said electrolyzed strongly acidic water has a pH of 2.7 to about 2.4, an oxidation reduction potential of from about 1100 mV to about 1150 mV and a dissolved chlorine concentration of about 15 to about 30 ppm, and wherein said electrolyzed strongly alkaline water has a pH of about 11.5 to about 12, and an oxidation reduction potential of from about −800 mV to −900 mV.

15. The method of claim 12, wherein the amount of said reverse osmosis processed water used to rinse out said electrolyzed strongly acidic water hermetically sealed in said compartments is from about 200 to 1000 ml.

* * * * *

UNITED STATES PATENT AND TRADEMARK OFFICE
CERTIFICATE OF CORRECTION

PATENT NO.      : 6,655,394 B1
DATED           : December 2, 2003
INVENTOR(S)     : Noriaki Tanaka and Tomiya Abe It is certified that error appears in the above-identified patent and that said Letters Patent is hereby corrected as shown below:

<u>Column 23,</u>
Lines 49-59, please delete Claim 2 and replace it with the following claim:
2. The method according to claim 1, wherein the electrolyzed strongly acidic water has a pH of 2.7 or lower, an oxidation reduction potential of at least 1100 mV and a dissolved chlorine concentration of about 10 to about 40 ppm.

Signed and Sealed this

Eighteenth Day of May, 2004

JON W. DUDAS
*Acting Director of the United States Patent and Trademark Office*